United States Patent
Tai

(10) Patent No.: US 7,908,846 B2
(45) Date of Patent: Mar. 22, 2011

(54) METHOD FOR CONTROLLING INJECTION IN A DIESEL ENGINE EXHAUST AFTERTREATMENT SYSTEM AND DIESEL ENGINE WITH EXHAUST AFTERTREATMENT SYSTEM

(75) Inventor: Chun Tai, Hagerstown, MD (US)

(73) Assignee: Mack Trucks, Inc, Greensboro, NC (US)

( * ) Notice: Subject to any disclaimer, the term of this patent is extended or adjusted under 35 U.S.C. 154(b) by 451 days.

(21) Appl. No.: 11/959,553

(22) Filed: Dec. 19, 2007

(65) Prior Publication Data

US 2009/0158712 A1  Jun. 25, 2009

(51) Int. Cl.
*F01N 3/00* (2006.01)
(52) U.S. Cl. ............ 60/286; 60/277; 60/285; 60/295
(58) Field of Classification Search ............ 60/284–287, 60/277, 295, 299–301
See application file for complete search history.

(56) References Cited

U.S. PATENT DOCUMENTS

| | | | |
|---|---|---|---|
| 7,111,455 B2 * | 9/2006 | Okugawa et al. | 60/295 |
| 2006/0042234 A1 * | 3/2006 | Song et al. | 60/286 |
| 2006/0236686 A1 | 10/2006 | Rellecati et al. | |
| 2006/0260299 A1 * | 11/2006 | Wang et al. | 60/297 |
| 2007/0089403 A1 * | 4/2007 | Pfeifer et al. | 60/286 |

* cited by examiner

*Primary Examiner* — Binh Q Tran
*Assistant Examiner* — Jesse Bogue
(74) *Attorney, Agent, or Firm* — WRB-IP LLP

(57) ABSTRACT

A method for controlling injection of a substance in a diesel engine exhaust after treatment system includes generating a feedforward signal as a function of a desired output signal, the desired output signal corresponding to an output sought to be achieved through injection of the substance. Actual system output is measured and an actual output signal is generated corresponding to an output actually achieved through injection of the substance. The desired output signal and the actual output signal are compared and an error signal is generated corresponding to a difference between the desired output signal and the actual output signal. A control signal is generated as a function of the error signal and the feedforward signal for controlling an amount of the substance to inject, and the feedforward signal is adjusted by an adaptive factor, the adaptive factor being a function of the error signal. A diesel engine is also provided.

23 Claims, 2 Drawing Sheets

METHOD FOR CONTROLLING INJECTION IN A DIESEL ENGINE EXHAUST AFTERTREATMENT SYSTEM AND DIESEL ENGINE WITH EXHAUST AFTERTREATMENT SYSTEM

BACKGROUND AND SUMMARY

The present invention relates generally to a method and apparatus for controlling an injector in a diesel engine exhaust aftertreatment system and, more particularly, to a method and apparatus that compensates for deviations from expected performance of the injector.

In diesel engines, it is typical to use a diesel particulate filter DPF downstream of the engine to filter particulates from the engine exhaust. If too much soot collects on the DPF, the soot can burn in an uncontrolled manner and may crack or melt the DPF. This phenomenon is sometimes referred to as so-called "runaway" or uncontrolled regeneration. To avoid problems such as runaway regeneration, it is common to periodically inject fuel via a so-called "seventh injector" into the exhaust pipe to burn off the soot. Over time, the seventh injector tends to get plugged by soot (particular matter). Fuel pressure may also vary due to fuel supply system degradation over time such as when the fuel filter gets plugged. There may also exist variations in flow capacity from engine to engine due to manufacturing variabilities. It is desirable to compensate for these phenomena to ensure proper control of temperature in the exhaust stream to burn off the soot on the DPF in a controlled manner that does not damage the DPF. Similar problems associated with clogging of injectors are true for other injectors in the diesel exhaust aftertreatment system, such as urea injectors for selective catalytic reduction devices, and it is similarly desirable to compensate for clogging in these systems.

According to an aspect of the present invention, a method for controlling injection of a substance in a diesel engine exhaust aftertreatment system comprises generating a feedforward signal as a function of a desired output signal, the desired output signal corresponding to an output sought to be achieved through injection of the substance, measuring actual system output and generating an actual output signal corresponding to an output actually achieved through injection of the substance, comparing the desired output signal and the actual output signal and generating an error signal corresponding to a difference between the desired output signal and the actual output signal, generating a control signal as a function of the error signal and the feedforward signal for controlling an amount of the substance to inject, and adjusting the feedforward signal by an adaptive factor, the adaptive factor being a function of the error signal.

According to another aspect of the present invention, a diesel engine with an exhaust aftertreatment system comprises at least one injector device for injecting a substance into an exhaust stream, at least one sensor for measuring an actual system output resulting from injection of the substance and generating an actual output signal, a controller arranged to compare a desired output signal, the desired output signal corresponding to an output sought to be achieved through injection of the substance, and the actual output signal, the actual output signal corresponding to an output actually achieved through injection of the substance, and generate an error signal corresponding to a difference between the desired output signal and the actual output signal, the controller being arranged to generate a feedforward signal in response to the desired output signal, the controller being arranged to generate a control signal as a function of the feedforward signal and the error signal for controlling an amount of the substance to inject, and the controller being arranged to adjust the feedforward signal by an adaptive factor, the adaptive factor being a function of the error signal.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
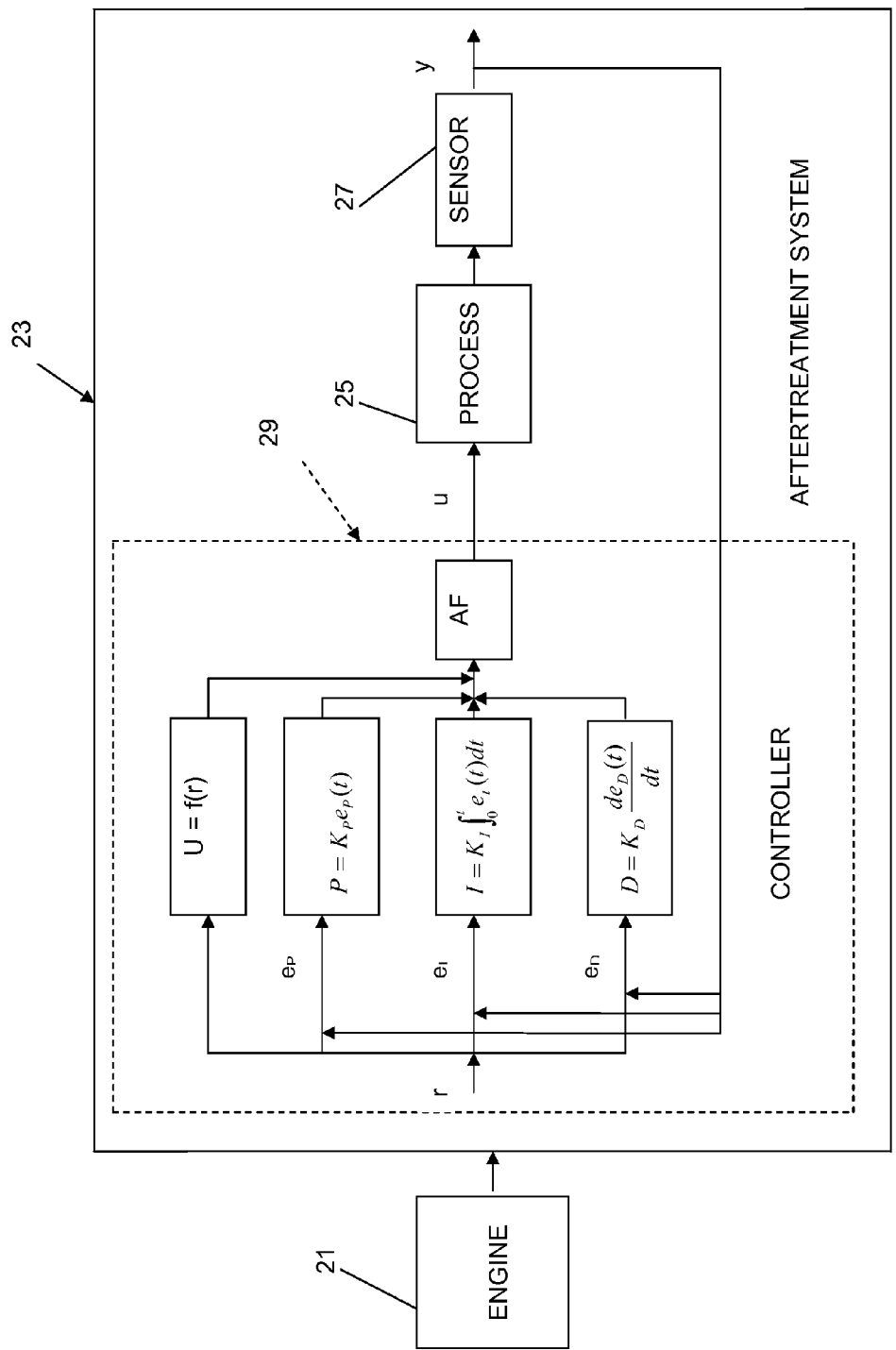
FIG. 1 is a schematic view of a diesel engine and aftertreatment system according to an aspect of the present invention.

A diesel engine 21 with an exhaust aftertreatment system 23 is shown in FIG. 1. The exhaust aftertreatment system 23 comprises at least one process or plant, in an illustrative example comprising an injector device 25 for injecting a substance into an exhaust stream. The injector device 25 can be an injector such as a seventh injector for injection of fuel into the exhaust stream to facilitate active regeneration of a diesel particulate filter (DPF) or an injector such as a urea injector for a selective catalytic reduction device.

A signal r corresponding to a desired system output is generated, such as by being preprogrammed in a controller 29 such as the engine's EPU, although the signal can be generated manually or otherwise. The desired output signal r corresponds to an output sought to be achieved through injection of the substance by the injector device 25. At least one sensor 27 is provided for measuring an actual system output resulting from injection of the substance and generating an actual output signal y. The actual output signal y corresponds to an output actually achieved through injection of the substance. In response to an input signal r, the controller 29 generates a feedforward signal U for controlling the injector 25 to inject an amount of the substance that, according to modeling for the system under ideal conditions, is expected to cause the actual output to approach or equal the desired output.

The controller 29 is arranged to compare the desired output signal r and the actual output signal y instantaneously and over time t and to generate an error signal corresponding to a difference between the desired output signal and the actual output signal. The controller 29 comprises a Proportional Integral Derivative controller, and the tracking error signal e(t) (FIG. 2) comprises a proportional error $e_P$, a integral error $e_I$, and a derivative error $e_D$. The controller generates a PID signal comprising a proportional signal $P = K_P e_P(t)$, an integral signal $$I = K_I \int_0^t e_P(t)\,dt,$$

and a derivative signal $$D = K_D \frac{de_D(t)}{dt}.$$

$K_P$, $K_I$, and $K_D$ are constants peculiar to the particular system.

The signals P, I, and D can be used to control error in the system. The proportional signal P will ordinarily facilitate adjustments to the injection proportional to the error signal, i.e., large adjustments for large errors, smaller adjustments for small errors. The integral signal I will ordinarily be set to facilitate maintaining a desired output, i.e., preventing drift, and represents error accumulated over time. The derivative signal D will ordinarily represent the rate of change of the error signal over time.

The control signal u sent to the process/injector 25 is equal to a function of the feedforward signal U under ideal/modeled conditions and an adaptive factor AF. The adaptive factor AF is a function of the integral signal I and the feedforward signal U. The control signal may be a function of the feedforward signal U and the adaptive factor AF, such as where the adaptive factor is a factor by which the feedforward signal is multiplied. For example, the control signal u may be a function of multiplication of the signal U by the adaptive factor AF, i.e., $u=f(U\cdot AF)$. When the adaptive factor is multiplied by the signal U, with a properly functioning injector device 25, the adaptive factor is equal to unity, i.e., $AF=1$. As performance of the injector device 25 deviates from expected performance, such as when it becomes clogged or there is some other interference or problem with injection such that the error signal increases, the AF can be adjusted up or down so that the control signal u is increased or decreased to increase or decrease an amount of substance injected in response to the signal u as appropriate to reduce the error according to the modeling for the system operating with a properly functioning injector. The adjustment can occur not only when an injector injects less than expected, but also when the injector injects more than expected, such as when an old, clogged injector 25 is replaced with an unclogged injector, the adaptive factor AF can be readjusted to reduce error.

For example, in a seventh injector system for injecting fuel into an exhaust stream upstream of a DPF for active regeneration of the DPF, the control signal from the controller to the injector controlling parameters such as injector pressure for causing injection of an amount of fuel to raise the temperature of the exhaust stream to a desired level is based on an idealized system in which the injector is not clogged and is equal to the feedforward signal. If the seventh injector fuel injector becomes partially clogged, continuing to send the same control signal/feedforward signal for injector pressure may result in less fuel being delivered than intended, and a discrepancy between desired temperature and actual temperature of the exhaust stream may result. Merely continuing to send a control signal/feedforward signal for increasing temperature from the actual to the desired level according to an idealized system may never increase temperature to the desired level because less fuel is being injected than intended. By adjusting the control signal by the adaptive factor, the signal that is received by the injector system can cause the injector system to operate as though more fuel was demanded, e.g., injector pressure must be increased beyond the level that would have otherwise been called for, which can result in delivery of the appropriate amount of fuel to raise actual temperature to desired temperature.

Figure 2:
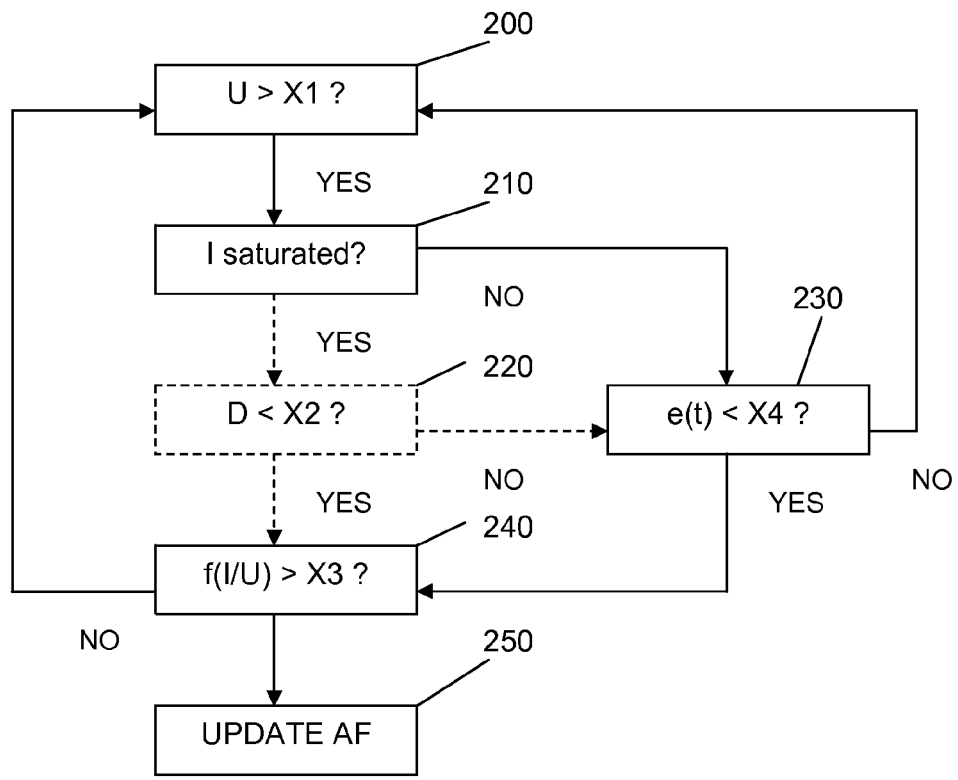
FIG. 2 is a flow chart showing steps for determining whether to update an adaptive factor for a control system.

According to an aspect of the invention, the controller 29 can be arranged to calculate the adaptive factor AF as a function of a ratio $f(I/U)$ of the integral signal I to the feedforward signal U. As seen in FIG. 2, the controller 29 is ordinarily arranged, e.g., programmed, to adjust the adaptive factor AF, thereby adjusting the feedforward signal U, only when the feedforward signal U exceeds a predetermined value X1 (step 200). If U is too small of a value, the ratio I/U may be too large and instability may result.

The controller 29 can be arranged to adjust the adaptive factor AF when the integral signal I is saturated as seen at step 210, which can be because further increase of the integral signal is disallowed in the control algorithm mostly due to concerns with control stability. Ordinarily, the controller 29 is arranged to adjust the adaptive factor when the integral signal I is saturated and the derivative signal D is less than a predetermined value X2, i.e., the error is not changing or is only changing at what is considered to be an insufficient rate with time, as shown in phantom in step 220 to illustrate that the step 220 can be eliminated. Ordinarily, the adaptive factor AF will be updated at step 250 only after function of a ratio of the integral signal I to the feedforward signal U, $f(I/U)$, is greater than a predetermined value X3 as seen in step 240, which reflects, inter alia, that sufficient error has accumulated.

As an alternative to adjusting the adaptive factor when the integral signal I is saturated (and, usually, when the derivative signal is less than X2), the controller 29 can be arranged to adjust the adaptive factor AF when the tracking error signal $e(t)$ is less than a predetermined value X4 as seen at step 230. When the error signal is small, i.e., P and D are close to zero, then whatever is in I represents the deviation of the system. The adaptive factor AF will ordinarily only be updated at step 250 only after function of a ratio of the integral signal I to the feedforward signal U, $f(I/U)$, at step 240 is greater than a predetermined value X3.

Figure 3:
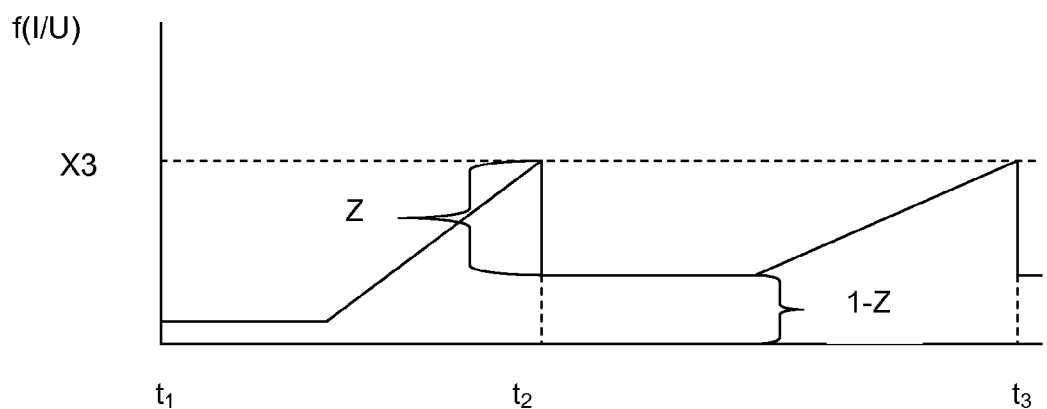
FIG. 3 is a graph of a signal corresponding to a function of system error over a feedforward signal.

Whatever conditions call for adjustment of the adaptive factor AF, as seen in FIG. 3, a signal of the function $f(I/U)$ can be filtered and, when the integral signal I increases over time, e.g., from time $t_1$ to time $t_2$, which reflects that the error is not being corrected over time, then, when the value of the signal of the function $f(I/U)$ exceeds the predetermined value X3, the controller 29 can adjust the adaptive factor AF by a portion Z of the function of the ratio $f(I/U)$. A remaining portion $(1-Z)$ of the function of the ratio can be saved in the filter and functions as a starting value from which accumulated error according to the function $f(I/U)$ is measured as the integral signal I increases from time $t_2$ to time $t_3$.

Periodically, the feedforward signal U can be adjusted to store the adjustment in the feedforward channel. For example, assuming P and D are both zero, and I is some non-zero value corresponding to the variation in the system, if the adaptive factor AF is adjusted from "1" to $(1+Z(I/U))$, where Z is a value between 0 and 1 representing a portion of the error by which the adaptive factor is to be updated, then $u=U\cdot AF$ goes from $u=U$ to $u=U+ZI$.

When AF is adjusted, it functions as a disturbance to the PID. For example, if P and D are zero and I is non-zero before the update, the update of AF will affect the control signal u to the process/injector 25, which could cause a non-zero proportional, integral, and derivative error. To minimize the impact of an AF update to the tracking error, whenever AF is updated, the I control signal can be adjusted accordingly such that the signal to the process 25 does not change. In other words, if the control signal $u=AF(U+P+I+D)$, when AF is updated, P and D are zero, and I can be adjusted so that u remains the same as before the update.

A method for controlling injection of a substance in a diesel engine 21 exhaust aftertreatment system 23 as seen in FIG. 1 comprises generating a desired output signal r, measuring actual system output with a sensor 27 and generating an actual output signal y, and comparing the desired output signal and the actual output signal and generating an error signal corresponding to a difference between the desired output signal and the actual output signal. A control signal u is generated by the controller 29 as a function of the error signals (proportional error $e_P$, integral error $e_I$, and derivative error $e_D$) for controlling the injector 25 to inject a necessary amount of the substance so that actual output y is closer to desired output r and the feedforward signal U. The control signal u will be a function of a feedforward signal U generated by the controller 29 assuming proper functioning of the injector device 25 and an adaptive factor AF to compensate for performance of the injector device that deviates from expected performance. In addition, the feedforward signal U can be adjusted by the adaptive factor AF when the feedforward signal exceeds a predetermined value X1 as seen in step 200 in FIG. 2.

The adaptive factor AF is typically adjusted as the result of either of at least two conditions occurring. For ascertaining a first condition that can be utilized to trigger adjustment of the adaptive factor AF (seen at step 250), the error signal e can be analyzed over time and the adaptive factor AF can be adjusted when, as seen in step 210, the signal I corresponding to an integral of the error signal is saturated, which will ordinarily mean that the error cannot be reduced by changing any input such as the desired output. The first condition can also require that a signal D corresponding to a derivative of the error signal be less than a predetermined value X2 as shown by dashed lines as step 220 in FIG. 2. This will ordinarily mean that the rate of change of error is zero or insufficiently fast.

The second condition that can be utilized to trigger adjustment of the adaptive factor AF at step 230 is that the error signal e is less than a predetermined value X4 as seen at step 230. This fact, coupled with the fact that the feedforward signal U is larger than X1 will ordinarily suggest the desirability of lowering the adaptive factor AF.

The adaptive factor AF is typically calculated as a function f(I/U) of a ratio integral signal I to the feedforward signal U. As seen in FIG. 3, a signal corresponding to the adaptive ratio is generated and tracked over time. When the signal corresponding to f(I/U) is greater than a predetermined value X3, then the adaptive factor AF is adjusted as a function of a portion Z of the function f(I/U) of the ratio and the remaining portion (1−Z) of the function of the ratio is saved in the filter.

Operation of an engine and method according to an aspect of the present invention shall be described using a seventh injector arrangement for purposes of illustration. When the arrangement is first operated at time $t_1$ (FIG. 3), the controller 29 sends a feedforward signal U=u to the injector 25, no or relatively little error accumulates over time, and the graph of the function f(I/U) is relatively flat. The adaptive factor AF to start will be assumed to be equal to 1. As the injector 25 starts to clog, error starts to accumulate and the graph of the function f(I/U) rises. When, at time $t_2$, this error reaches some predetermined level X3, say 10%, the error value is multiplied by a portion of the error, say 70%, the adaptive factor is adjusted by the portion of the error, i.e., AF=(1+(0.7·0.1)) =1.07, and the control signal u=1.07 U. The process is repeated each time the function of the error f(I/U) reaches the predetermined level X3 (e.g., at time $t_3$). The controller 29 can also be adjusted so that U is adjusted upwardly to U=1.07 U and AF is reset to 1. When, at some point, the old injector is replaced with a new injector, the large U and/or adaptive factor AF that had been developed over time with the old injector is quickly adjusted downward because the new injector will inject more fuel and cause a higher temperature than the old injector so a large error value will be generated, the accumulated function of the error f(I/U) becomes large very quickly and, consequently, the system adjusts downwardly very quickly.

The adaptive factor AF can also be adjusted, for example, to return to the condition where there is no error, whenever the feedback control PID is taken offline, such as when a DPF regeneration event is completed.

The parameter identification (learning) process according to an aspect of the present invention can be independent of the real-time feedback control. Therefore, it will not ordinarily contribute to problems of stability with the control system, which is a typical concern for adaptive control design and calibration.

Also, in an aspect of the present invention, the bigger the system variation, the faster the adaptive factor AF adjusts itself. This provides a mechanism that can quickly adjust itself to big changes, such as when a clogged injector is replaced by a new one. On the other hand, if the system variation is small, then the adaptive control does not adjust itself or adjusts slowly, which helps maintain the temperature tracking performance because every time the adaptive factor is changed, it acts as a disturbance to the PID feedback control and affects the temperature tracking.

In the present application, the use of terms greater than and less than, or corresponding symbols, is illustrative and can be understood to comprise both greater and less than, as well as greater than or equal to and less than or equal to. The use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for controlling injection of a substance in a diesel engine exhaust aftertreatment system, comprising:
    generating a feedforward signal as a function of a desired output signal, the desired output signal corresponding to an output sought to be achieved through injection of the substance;
    measuring actual system output and generating an actual output signal corresponding to an output actually achieved through injection of the substance;
    comparing the desired output signal and the actual output signal and generating an error signal corresponding to a difference between the desired output signal and the actual output signal;
    generating a control signal as a function of the error signal and the feedforward signal for controlling an amount of the substance to inject;
    adjusting the feedforward signal by an adaptive factor the adaptive factor being a function of the error signal;
    analyzing the error signal over time and adjusting the adaptive factor when a signal corresponding to an integral of the error signal is saturated;
    calculating a ratio of the integral of the error signal to the feedforward signal; and
    adjusting the adaptive factor when the signal corresponding to an integral of the error signal is saturated and the ratio exceeds a predetermined value.

2. The method as set forth in claim 1, comprising adjusting the feedforward signal by the adaptive factor when the feedforward signal exceeds a predetermined value.

3. The method as set forth in claim 1, comprising adjusting the adaptive factor when the signal corresponding to an integral of the error signal is saturated and a signal corresponding to a derivative of the error signal is less than a predetermined value.

4. The method as set forth in claim 1, comprising calculating the adaptive factor as a function of a ratio of the integral of the error signal to the feedforward signal.

5. The method as set forth in claim 4, comprising generating a signal corresponding to the adaptive factor, filtering the signal in a filter, and adjusting the adaptive factor by a portion of the function of the ratio and saving a remaining portion of the function of the ratio in the filter.

6. The method as set forth in claim 1, comprising adjusting the adaptive factor when the error signal is less than a predetermined value.

7. The method as set forth in claim 1, wherein the substance comprises fuel for injection through a fuel injector for diesel particulate filter regeneration.

8. The method as set forth in claim 1, wherein the substance comprises urea for selective catalytic reduction.

9. A method for controlling injection of a substance in a diesel engine exhaust aftertreatment system, comprising:
  generating a feedforward signal as a function of a desired output signal, the desired output signal corresponding to an output sought to be achieved through injection of the substance;
  measuring actual system output and generating an actual output signal corresponding to an output actually achieved through injection of the substance;
  comparing the desired output signal and the actual output signal and generating an error signal corresponding to a difference between the desired output signal and the actual output signal;
  generating a control signal as a function of the error signal and the feedforward signal for controlling an amount of the substance to inject;
  adjusting the feedforward signal by an adaptive factor, the adaptive factor being a function of the error signal;
  adjusting the adaptive factor when the error signal is less than a predetermined value; and
  analyzing the error signal over time and calculating the adaptive factor as a function of a ratio of an integral of the error signal to the feedforward signal.

10. The method as set forth in claim 9, comprising analyzing the error signal over time and adjusting the adaptive factor when a signal corresponding to an integral of the error signal is saturated.

11. The method as set forth in claim 9, comprising generating a signal corresponding to the adaptive factor, filtering the signal in a filter, and adjusting the adaptive factor by a portion of the function of the ratio and saving a remaining portion of the function of the ratio in the filter.

12. The method as set forth in claim 9, comprising adjusting the adaptive factor when the error signal is less than a predetermined value and the function of the ratio exceeds a predetermined value.

13. A diesel engine with an exhaust aftertreatment system, comprising:
  at least one injector device for injecting a substance into an exhaust stream;
  at least one sensor for measuring an actual system output resulting from injection of the substance and generating an actual output signal;
  a controller arranged to compare a desired output signal, the desired output signal corresponding to an output sought to be achieved through injection of the substance, and the actual output signal, the actual output signal corresponding to an output actually achieved through injection of the substance, and generate an error signal corresponding to a difference between the desired output signal and the actual output signal, the controller being arranged to generate a feedforward signal in response to the desired output signal, the controller being arranged to generate a control signal as a function of the feedforward signal and the error signal for controlling an amount of the substance to inject, and the controller being arranged to adjust the feedforward signal by an adaptive factor, the adaptive factor being a function of the error signal,
  wherein the controller is arranged to analyze the error signal over time and adjust the adaptive factor when a signal corresponding to an integral of the error signal is saturated, and to adjust the adaptive factor when the signal corresponding to an integral of the error signal is saturated and a signal corresponding to a derivative of the error signal is less than a predetermined value.

14. The engine as set forth in claim 13, wherein the controller is arranged to adjust the feedforward signal by the adaptive factor when the feedforward signal exceeds a predetermined value.

15. The engine as set forth in claim 13, wherein the controller is arranged to adjust the adaptive factor when the error signal is less than a predetermined value.

16. The engine as set forth in claim 15, wherein the controller is arranged to analyze the error signal over time and calculate the adaptive factor as a function of a ratio of an integral of the error signal to the feedforward signal.

17. The engine as set forth in claim 16, wherein the controller is arranged to adjust the adaptive factor when the error signal is less than a predetermined value and the ratio exceeds a predetermined value.

18. The engine as set forth in claim 13, wherein the injector is for injecting fuel for diesel particulate filter regeneration.

19. The engine as set forth in claim 13, wherein the injector is for injecting urea for selective catalytic reduction.

20. A diesel engine with an exhaust aftertreatment system, comprising:
  at least one injector device for injecting a substance into an exhaust stream;
  at least one sensor for measuring an actual system output resulting from injection of the substance and generating an actual output signal;
  a controller arranged to compare a desired output signal, the desired output signal corresponding to an output sought to be achieved through injection of the substance, and the actual output signal, the actual output signal corresponding to an output actually achieved through injection of the substance, and generate an error signal corresponding to a difference between the desired output signal and the actual output signal, the controller being arranged to generate a feedforward signal in response to the desired output signal, the controller being arranged to generate a control signal as a function of the feedforward signal and the error signal for controlling an amount of the substance to inject, and the controller being arranged to adjust the feedforward signal by an adaptive factor, the adaptive factor being a function of the error signal,
  wherein the controller is arranged to analyze the error signal over time and adjust the adaptive factor when a signal corresponding to an integral of the error signal is saturated, and to calculate a ratio of the integral of the error signal to the feedforward signal and adjust the adaptive factor when the signal corresponding to an integral of the error signal is saturated and the ratio exceeds a predetermined value.

21. The engine as set forth in claim 20, wherein the controller is arranged to adjust the adaptive factor when the error signal is less than a predetermined value.

22. The engine as set forth in claim 21, wherein the controller is arranged to analyze the error signal over time and calculate the adaptive factor as a function of a ratio of an integral of the error signal to the feedforward signal.

23. The engine as set forth in claim 22, wherein the controller is arranged to adjust the adaptive factor when the error signal is less than a predetermined value and the ratio exceeds a predetermined value.

* * * * *